United States Patent [19]

Pinchefsky

[11] Patent Number: 4,806,805

[45] Date of Patent: Feb. 21, 1989

[54] ELECTRICAL ENERGY GENERATING SYSTEM UTILIZING A MOVING VEHICLE

[76] Inventor: Barry Pinchefsky, 240 W. 73rd St., Apt. 1201, New York, N.Y. 10023

[21] Appl. No.: 75,769

[22] Filed: Jul. 20, 1987

[51] Int. Cl.[4] ............................................. H02K 41/00
[52] U.S. Cl. ..................................... 310/112; 104/307
[58] Field of Search .................................. 310/12–15; 104/289, 290, 295, 296, 288, 307; 105/355; 318/135; 191/10

[56] References Cited

U.S. PATENT DOCUMENTS

| | | | |
|---|---|---|---|
| 1,702,997 | 2/1929 | Ewing et al. | 310/18 |
| 2,409,857 | 10/1946 | Hines et al. | 310/15 |
| 3,353,131 | 11/1967 | Stubbs et al. | 310/13 |
| 3,497,733 | 2/1970 | Girerd et al. | 310/18 |
| 3,513,338 | 5/1970 | Poloujadoff | 104/289 |
| 3,701,321 | 10/1970 | Lee | 104/148 |
| 3,943,443 | 3/1976 | Kimura | 310/15 X |
| 4,092,554 | 5/1978 | Quinn | 310/13 |
| 4,160,181 | 7/1979 | Lichtenberg | 310/166 |

Primary Examiner—R. Skudy
Attorney, Agent, or Firm—Felfe & Lynch

[57] ABSTRACT

An electrical energy generating system utilizing a moving vehicle is described. The system includes magnet means preferably affixed to a moving vehicle for producing a magnetic field. An induction coil means is positioned in the magnetic field and preferably extending in a parallel direction relative to the magnet means so that the magnetic field passing through the induction coil generates electrical energy which may be stored in a storage means.

4 Claims, 2 Drawing Sheets

ELECTRICAL ENERGY GENERATING SYSTEM UTILIZING A MOVING VEHICLE

FIELD OF THE INVENTION

The present invention relates to the generation of electrical energy by the positioning of a coil means within the magnetic field produced by a magnet means which is attached to a moving vehicle, such as a railroad train, automobile, bus, etc.

BACKGROUND OF THE INVENTION

One method for generating electrical energy by a linear electrical generating system is known which includes mounting magnets on an undercarriage of a railroad vehicle to produce a magnetic field across coils mounted on the third rail of a railroad track. See U.S. Pat. No. 4,092,554 issued on May 30, 1978 to Quinn.

The problem with this system is that the positioning of the magnet around the third rail and on the undercarriage of the train limits both the size and the shape of the magnet. For example, a horseshoe-shaped magnet rather than a bar magnet is used to position the magnet and coil close enough to produce a magnetic field.

Additionally, all matter of metal debris inevitably found on railroad bed is picked up by the magnet, short circuiting the magnet and diminishing its magnetic efficiency over time. Further, the powerful conducting rails and steel underframe of the railroad track short circuit the magnetic field produced and lessen the electrical energy output.

The present invention addresses and solves these problems by preferably positioning a magnet means on the upper portion of a moving vehicle, such as the top or sides. An induction coil, preferably extends in a parallel direction relative to the positioned magnets and encircles the magnets within the magnetic field produced. Electrical energy produced may be used as an auxiliary power source to ensure on-board lighting or air conditioning as, for example, in a railroad train or be stored in storage units to be utilized by individuals or municipalities as auxiliary power sources.

SUMMARY OF THE INVENTION

It is an object of the present invention to generate electrical energy by means of a magnet means to produce a magnetic field within which an induction coil means is positioned.

According to the invention, magnets, preferably in the form of bar magnets, are positioned on either the top and/or sides of the upper body of a moving vehicle. An induction coil means is positioned within the magnetic field produced by the magnet means extending in a parallel direction relative to the magnet means, whereby the magnetic field moves along the induction coils to produce electrical energy. A storage means is electrically connected to the induction coil to store the generated electrical energy for use either by the moving vehicle for on-board power uses, individual consumers or by a municipality within the vicinity of the electrical energy generating system.

DETAILED DESCRIPTION OF THE PREFERRED EMBODIMENT

Figure 1:
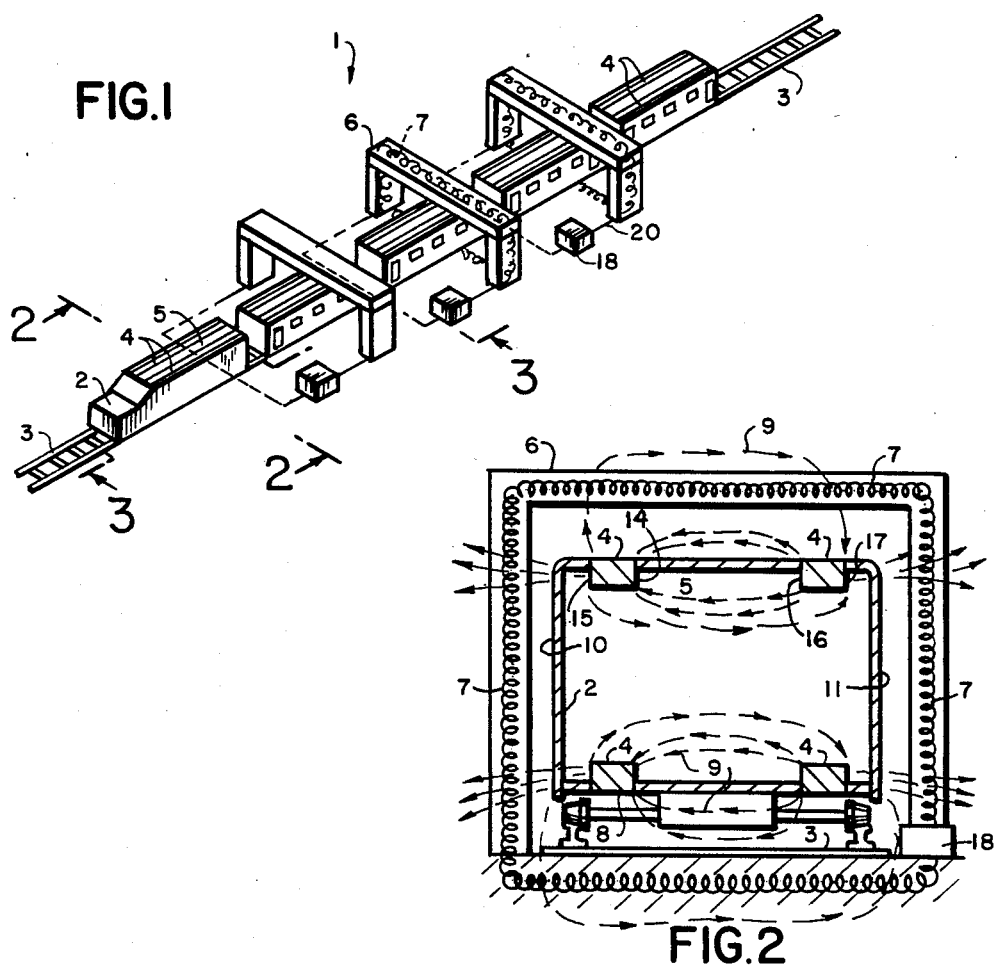
FIG. 1 is a perspective view of the electrical energy generating system utilizing a railroad vehicle.
Figure 2:
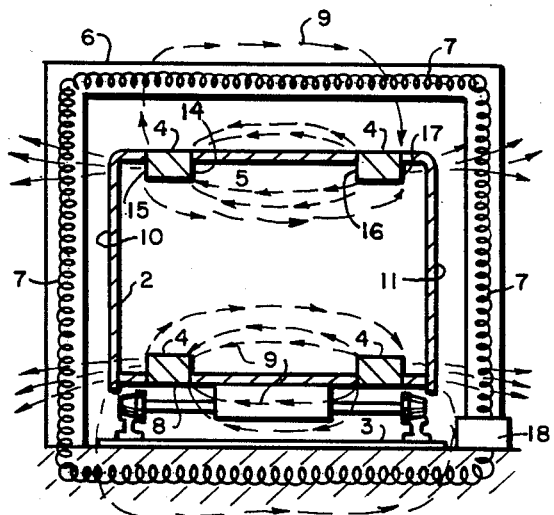
FIG. 2 is a cross-sectional view taken along lines 2—2 of FIG. 1, illustrating the magnet and induction coil of the system.
Figure 3:
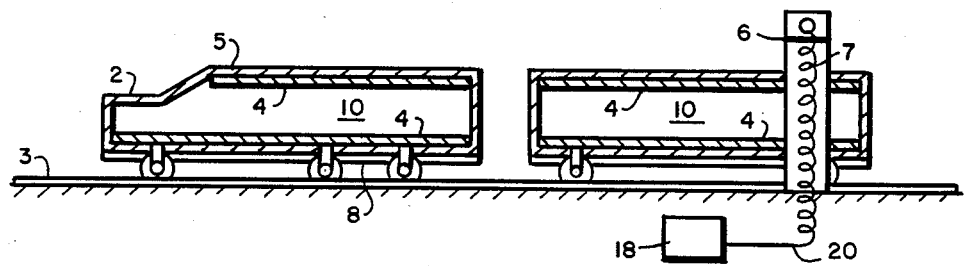
FIG. 3 is a longitudinal sectional view taken along lines 3—3 of FIG. 1, illustrating a plurality of magnets positioned on the moving railroad vehicle.

As illustrated in FIGS. 1 and 2, the electrical energy generating system 1 may be used with a moving vehicle such as a railroad car 2 and railroad track 3 for ease of implementation. In the preferred embodiment, a plurality of magnets 4 are affixed to a top side 5 and bottom side 8 of the railroad car 2 with opposing magnetic poles paired. Induction coil supporters 6 sheathing induction coils 7 are positioned in the lines of force a of the magnets 4 to form a completed circle which completely encircles the railroad car 2 by passing underground beneath the undercarriage 8 of the car 2.

It may be appreciated by one skilled in the art that the induction coils 7 may alternatively be mounted on the moving vehicle or railroad car 2, while the magnets are stationarily fixed to, for example, a face side of a tunnel (not shown in the drawings) or arch within the magnetic flux lines 9 (not shown in drawings).

The coil supporters 6 may be constructed as archs through which the moving vehicles pass or the induction coils 7 may be affixed to a face-side of an existing tunnel. It may thus be appreciated that any moving vehicle may be utilized for carrying magnets in proximity to the induction coils to produce electricity.

In the preferred embodiment as illustrated in FIG. 1 and in cross section in FIG. 2, the induction coils 7 may include any number of coils wound together, preferably at least 30 turns per coil. Further, the coils 7 may be wound around a core, such as a core made of an iron material, or may be tightly wound without a core.

Electrical railroad trains are preferable to trains powered by other forms of energy such as coal, oil or steam. Furthermore, it is preferable to utilize vehicles constructed as much as possible with non-ferromagnetic materials, such as aluminum, aluminum alloy, stainless steel, plastic, etc. to reduce short circuiting of the system by ferromagnetic materials.

The magnets 4 are preferably positioned about 12 inches away from the induction coils 7 to not only provide that the coils 7 will be positioned in the magnetic flux lines 9 to prevent any dislocation of the coils due to the sway of the train.

Moreover, if more than one magnet is used per each top side 5 or on either of the two sides 10, 11 of the vehicle, the magnets should be positioned to provide the greatest number of magnetic fields. As illustrated in FIGS. 1 and 2 the two bar magnets 4 utilized on a top side 5 are positioned in a parallel direction relative to each other and separated from each other to create a magnetic field on each side 14, 15 and 16, 17 of the magnets 4.

Superconductor magnets are particularly useful in the present invention to form the desired magnetic flux lines 9. The number and size of conventional bar magnets needed to generate a sufficient amount of electricity is drastically reduced by using the new generation of superconductive materials which can be formed into magnets, as well as electrical conductors, for conducting the generated electricity from the system 1 to a storage unit 18.

Figure 4:
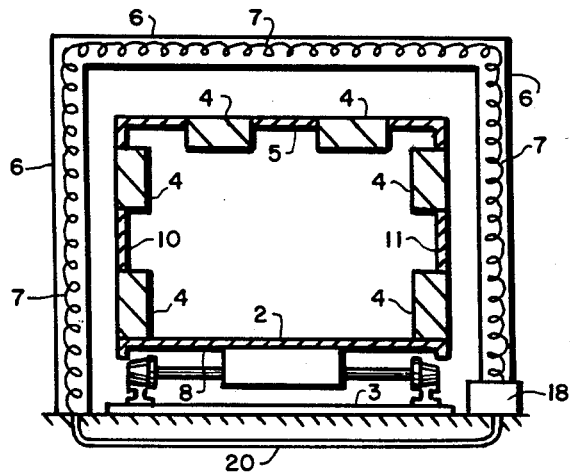
FIG. 4 illustrates a second embodiment of the system as shown in FIG. 2 having magnet means and induction coils on three sides of the upper body of the railroad vehicle.
Figure 5:
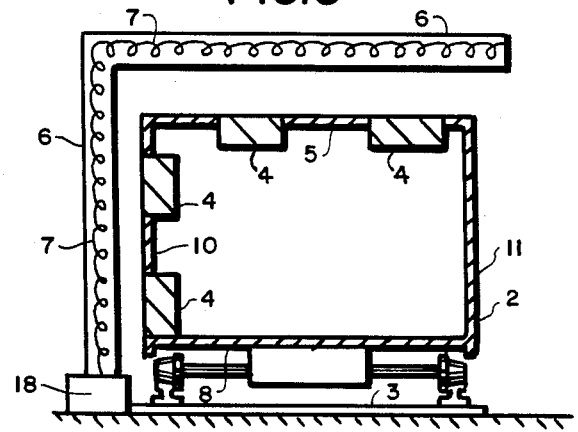
FIG. 5 is a third embodiment of the system as shown in FIG. 4 illustrating the magnet means and coil means positioned on two sides of a railroad vehicle.
Figure 6:
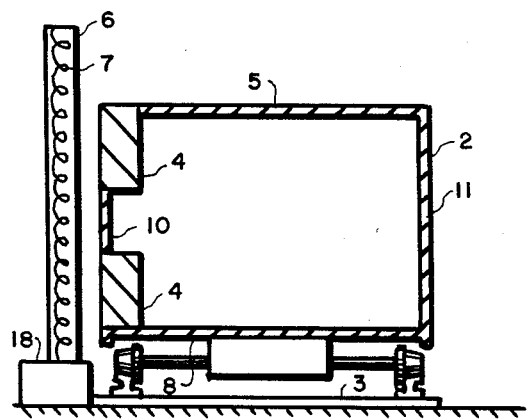
FIG. 6 is a fourth embodiment of FIG. 5 illustrating the magnet means and induction means on one side of the railroad vehicle.

Other embodiments of the system are shown in FIGS. 4–6. In FIG. 4, magnets 4 are affixed to the top 5 and sides 10 and 11 of each railroad car in a railroad train to increase the energy output. The induction coils 7 extend in parallel directions relative to the magnets 4 on all three sides of the vehicle and form a complete circle by passing underground beneath the undercarriage of the train 2.

In FIG. 5, the magnets 4, are positioned on one side 10 and on a top portion 5 of the vehicle, while in FIG. 6, the magnets 4 are positioned only on one side 10 of the vehicle.

Figure 7:
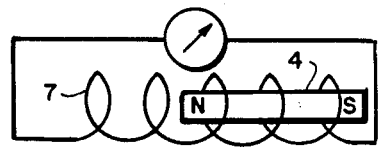
FIG. 7 is a schematic illustration of the Faraday experiment on the induction of electricity.

The theory of electrical induction from a magnet moved through wire coils was demonstrated in a Faraday experiment and is schematically illustrated in FIG. 7. Further, as illustrated in FIG. 2, since the magnetic field of two parallel positioned magnets is strongest along adjacent ends the magnets are preferably separately positioned on the railroad car 2, rather than directly side by side to enhance the strength of the resulting magnetic field as illustrated in FIGS. 3–6.

Electrical energy produced is stored in a storage means 18 either outside the moving vehicle or in a generator on the vehicle. The storage means is electrically connected to the induction coil 7 whereby the electrical energy produced by the magnetic field running through the coil is passed through a connector means 20 into the storage means 18 and available for use. It may be appreciated that the connector means 20 may be of any type known in the art.

The various features of novelty which characterize the invention are pointed out with particularity in the claims annexed to and forming a part of this specification. For a better understanding of the invention, its operating advantages and specific objects obtained by its use, reference should be had to the accompanying drawings and descriptive matter in which there is illustrated and described a preferred embodiment of the invention.

I claim:
1. An electrical energy generating system connected to a moving vehicle comprising:
   (a) magnet means affixed to a side portion and a top of the moving vehicle for producing a magnetic field, said magnet means having a bar magnet;
   (b) coil means positioned within the magnetic field of said magnet means, whereby the magnetic means moves along said coil means to produce electrical energy in said coil means; and
   (c) storage means electrically connected to said coil means for storing electrical energy produced in said coil means.
2. An electrical energy generating system according to claim 1, wherein said coil means extends in a parallel direction relative to said magnet means.
3. An electrical energy generating system according to claim 1, wherein said coil means comprises an electronmagnet.
4. An electrical energy generating system utilizing a railroad train comprising:
   (a) magnetic means having a bar magnet affixed on a top and a side portion of the body of the railroad train for producing a magnetic field;
   (b) induction coil means encircling the magnetic means and the railroad train, said coil means positioned with the magnetic field generated by said magnet means and extending in a parallel direction relative to said magnet means whereby the magnetic field produced by said magnet means travels along said induction coil means producing electrical energy; and
   (c) storage means electrically connection to said induction coil means for storing the electrical energy generated by the magnetic field.

* * * * *